UNITED STATES PATENT OFFICE.

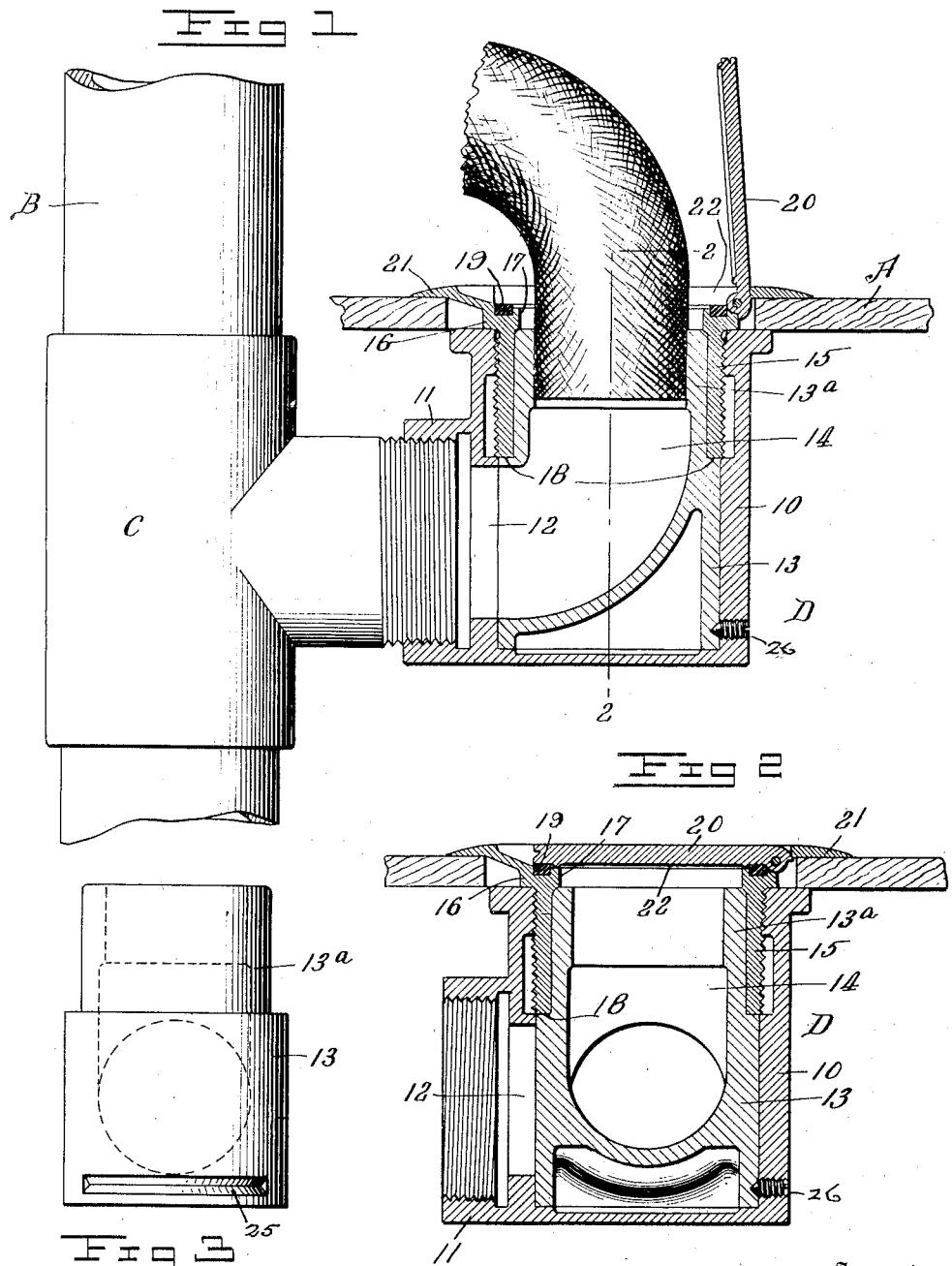

CHARLES R. THURMAN, OF PITTSBURGH, PENNSYLVANIA, ASSIGNOR TO ELECTRIC RENOVATOR MANUFACTURING COMPANY, OF PITTSBURGH, PENNSYLVANIA, A CORPORATION OF PENNSYLVANIA.

VALVE CONNECTION FOR PNEUMATIC CLEANING SYSTEMS.

1,036,378.　　　　　Specification of Letters Patent.　　Patented Aug. 20, 1912.

Application filed August 15, 1911. Serial No. 644,210.

*To all whom it may concern:*

Be it known that I, CHARLES R. THURMAN, a citizen of the United States, residing at Pittsburgh, in the county of Allegheny and State of Pennsylvania, have invented new and useful Improvements in Valve Connections for Pneumatic Cleaning Systems, of which the following is a specification.

This invention relates generally to vacuum cleaning systems, and more particularly to a valved hose coupling member for use in connection therewith into which member one end of a flexible hose, carrying a cleaning tool on the other end, is thrust when it is desired to operate said tool.

The invention is shown as applied to a coupling designed to be inserted in a floor or wall substantially flush therewith and closed by a flap valve to prevent dirt and dust entering thereinto when not connected to a hose. The inner end of the coupling member is connected to an exhaust pipe placed below the floor or in the wall and leading to an air exhaust mechanism of any approved type. Hose couplings provided with flap or other closing valves which must be opened before the hose can be attached, are deemed very objectionable in hospitals and other places where perfect quiet is needed, owing to the noise produced by the inrush of air through the coupling member when the valve is opened.

To prevent this inrush of air and thus avoid the unpleasant sounds caused thereby is the principal object of the present invention. This object is attained in a simple and efficient manner by providing a casing formed with a suitable connection for attaching it to the pipe of the exhaust apparatus and mounting in said casing a rotatable plug having a passageway therethrough into one end of which passageway the hose of the suction tool is inserted, the other end of the passageway registering with an opening or port in the casing leading to the exhaust pipe when the plug is in one position, and cut off from said passage when rotated a sufficient distance in one or the other direction. The plug is operated to open and close the port, preferably but not necessarily, by turning the hose after its insertion in the plug, there being sufficient frictional resistance between the hose and the wall of the passage to permit this. One means for accomplishing this desired result is illustrated in the accompanying drawings in which—

Figure 1 is a central sectional view through the improved coupling as it appears when placed in the floor and connected to the exhaust pipe, a hose being shown in position, and the passage in the plug open to the exhaust pipe. Fig. 2 is a similar view of the coupling only with the plug turned to cut off the flow of air therethrough, and Fig. 3 is an elevation of the plug removed from the casing.

In the drawings, wherein like reference characters are used to designate the same parts in all the figures, A indicates the floor of a room and B a fixed pipe, forming a part of the permanent air exhaust apparatus which may, as shown, be inclosed within the wall of a building and provided with one or more T's C, or other suitable fittings for the attachment of the improved hose couplings D, one alone being shown.

In the present form of the invention the numeral 10 designates a cylindrical casing from one side of which projects an interiorly threaded socket 11 screwed tightly on the T C and preferably bearing at its upper end against the underside of the floor A, as shown, or against the inner side of a wall if inserted therein. Through the wall of the casing 10 from the socket 11 is an opening 12 communicating with the interior of the casing for the passage of air into the pipe B from the coupling. The interior of the casing 10 is cylindrical in cross section and has inserted therein a plug 13, the lower half of which is of a simliar shape fitting the same air tight and rotatable about its axis. The upper half 13ª of the plug 13 is of less diameter than the lower half, or in other words it is necked down as shown in Fig. 3 and spaced from the circular wall of the casing. The top of the neck is in substantially the plane of the top of the casing. Within the plug 13, in the form shown in the drawing, there is a passageway 14 opening through the top of the plug and through one side thereof in position to register with the opening 12 in the casing when the plug is turned into operative position. The reduced upper end or neck 13ᵃ of the plug is made smooth so as to turn in a retaining sleeve 15, the perimeter of which is threaded to engage similar threads on the interior of the casing 10 at its upper end. A flange 16 projects from the upper end of the sleeve 15 and bears against the upper end of the casing 10 to limit the inward movement of the sleeve. A continuation of the flange 17 overlies the end of the plug 13 and assists in retaining it in the casing. The lower end of the sleeve 15 bears on the shoulder 18 formed where the neck 13ᵃ joins the plug 13 and also assists in holding the plug in the casing. The upper face of the flange 16 is formed with a circumferential groove or slot to receive a gasket 19. Pivoted to the flange 16 at one side is a flap valve 20 adapted to be opened and closed by hand and when closed to seat air tight on the gasket 19. A thin flange or escutcheon 21 extends outwardly from the sleeve 15 and rests against the floor, as shown. This flange or escutcheon is made thin so as not to present any obstruction, and is formed with a depression 22 into which the flap valve 20 enters when closed.
When not in use, the plug 13 is turned to the position represented in Fig. 2 which closes the opening 12 leading into the pipe B. The flap valve 20 may, under such condition, be opened without fear of air entering the coupling. The hose E may now be inserted in the passageway 14 and pushed therein until tight, after which by turning it and the plug until the passageway 14 registers with the opening 12 suction will be set up in the hose and the cleaning tools attached thereto rendered operative.

To limit the movement of the plug when turned off and on, a groove 25 may be made in the peripheral surface of the plug near the bottom to receive the pointed end of the screw or bolt 26 threaded through the casing 10. The groove will preferably be of a length sufficient to permit a quarter revolution only of the plug so that the ends of the groove striking the screw 26 serve as stops to arrest the plug when fully turned off and on.

What I claim is:—

1. A hose coupling comprising a casing, a turning plug situated wholly within said casing and having a passage way therethrough adapted to receive and hold one end of a hose by means of which hose said plug may be turned to bring the passage way into and out of register with a port in the casing, and an annular retaining member connected to the casing and bearing on the plug to keep it in place.

2. A hose coupling for vacuum cleaning systems comprising a casing adapted to be attached to an exhaust apparatus, a turning plug fitting fluid tight in said casing and having a passageway therethrough adapted to receive one end of a hose by means of which hose said passageway may be moved into and out of register with an exhaust opening in the casing, and a sleeve threaded into said casing in contact with the plug for holding said plug in position.

3. A hose coupling for vacuum cleaning systems comprising a fixed casing adapted to be attached to an exhaust apparatus below a floor or within a wall and having an interiorly threaded outer end, a turning plug fitting fluid tight within said casing and having a passageway therethrough which may be turned into and out of engagement with an exhaust opening in the casing wall, said passageway having its outer end designed to tightly receive a hose end, and an externally threaded sleeve fitted between the upper end of the plug and the casing for holding the plug in position, said sleeve having a thin integral escutcheon to bear against the floor or wall.

4. A hose coupling for vacuum cleaning systems comprising a fixed casing adapted to be attached to an exhaust apparatus below a floor or within a wall and having an interiorly threaded outer end, a turning plug fitting fluid tight within said casing and having a passageway therethrough which may be turned into and out of engagement with an exhaust opening in the casing wall, said passageway having its outer end designed to tightly receive a hose end, and an externally threaded sleeve fitted between the upper end of the plug and the casing for holding the plug in position, said sleeve having an outer and an inner flange to bear on the casing and the plug respectively, a thin escutcheon integral with said sleeve contacting with the floor or wall, and a flap valve pivoted to said sleeve and adapted to close flush with the escutcheon.

5. A hose coupling comprising a casing, a turning plug situated wholly within said casing having an external shoulder and a through passage way adapted to receive and hold one end of a hose by means of which hose said plug may be turned to bring the passage way into and out of register with a port in the casing, and an annular retaining member connected to the casing and bearing on said shoulder for holding the plug in position.

6. A hose coupling comprising a casing having a port, a turning plug situated wholly within said casing having an external shoulder and a through passageway adapted to receive at one end and hold firmly the end of a hose by means of which said plug may be turned to bring the other end of the passage way into and out of register with said port in the casing, and an annular retaining member threaded into the casing and bearing at its lower end on the external shoulder of the plug, said retaining member having an external flange forming an escutcheon to coöperate with the casing for clamping the same to a support.

In testimony whereof I have hereunto set my hand in presence of two subscribing witnesses.

CHARLES R. THURMAN.

Witnesses:
A. H. CLARKE,
A. E. FORTLAGE.